United States Patent [19]
Kolste

[11] 3,765,374
[45] Oct. 16, 1973

[54] RODENT CAGE SYSTEM

[76] Inventor: John J. Kolste, 1736 N. 2nd St., Sheboygan, Wis. 53081

[22] Filed: Sept. 28, 1971

[21] Appl. No.: 184,449

[52] U.S. Cl. .................................................. 119/18
[51] Int. Cl. ............................................. A01k 01/00
[58] Field of Search ................................. 119/18, 17

[56] References Cited
UNITED STATES PATENTS

| | | | |
|---|---|---|---|
| 3,074,375 | 1/1963 | Finkel | 119/18 |
| 3,127,872 | 4/1964 | Finkel | 119/18 X |
| 3,585,968 | 6/1971 | Stone, Jr. | 119/18 |

*Primary Examiner*—Hugh R. Chamblee
*Attorney*—Morsell & Morsell

[57] ABSTRACT

A rodent cage system having a plurality of cage-supporting cantilever beams journalled one above the other to a vertical supporting column. Each of the cantilever beams is hollow and supports a plurality of water containers within the beam and a plurality of rodent cages on the exterior of the beam, there being a removable droppings-tray at the bottom of each cage. Each of the water containers has a water outlet opening near its bottom. A row of water access openings is formed in the hollow beam to provide access from the cages to the water outlet openings. The water access openings are large enough to allow access to the water outlet openings but are too small to permit rodents within the cages to gnaw on the water containers. Feed hoppers having sloping sides are attached along each of the cantilever beams between the beam and the adjacent rodent cages.

13 Claims, 11 Drawing Figures

PATENTED OCT 16 1973 3,765,374

INVENTOR
JOHN J. KOLSTE

BY
Morsell & Morsell
ATTORNEYS

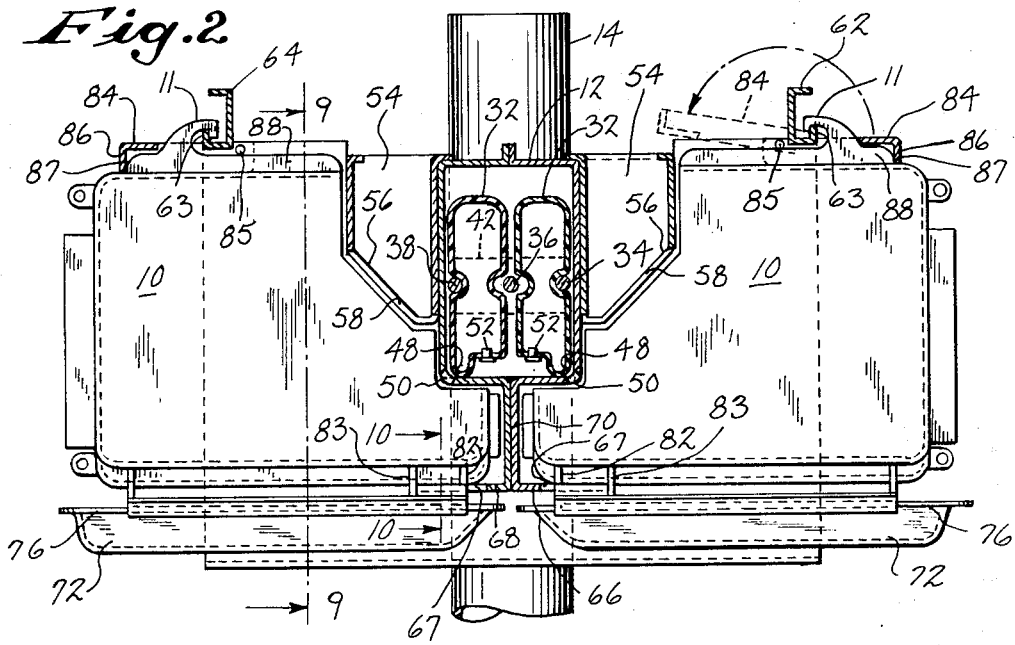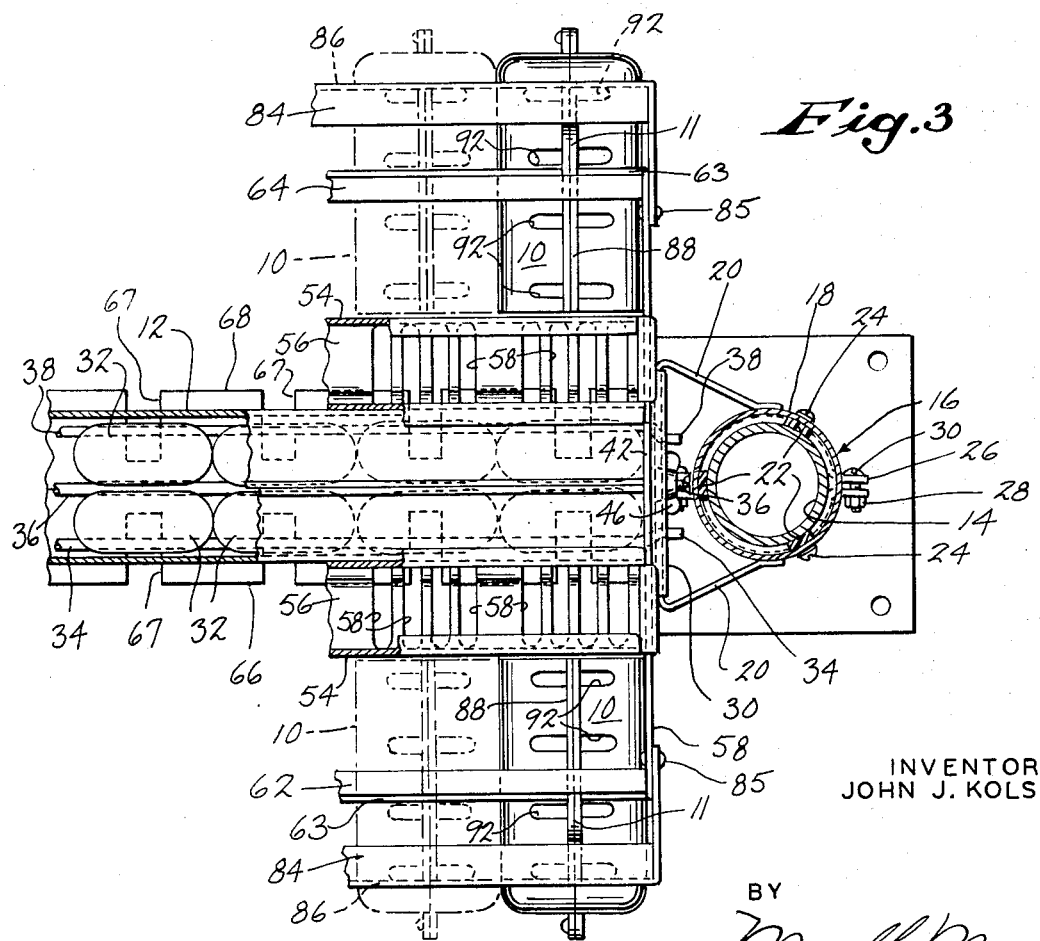

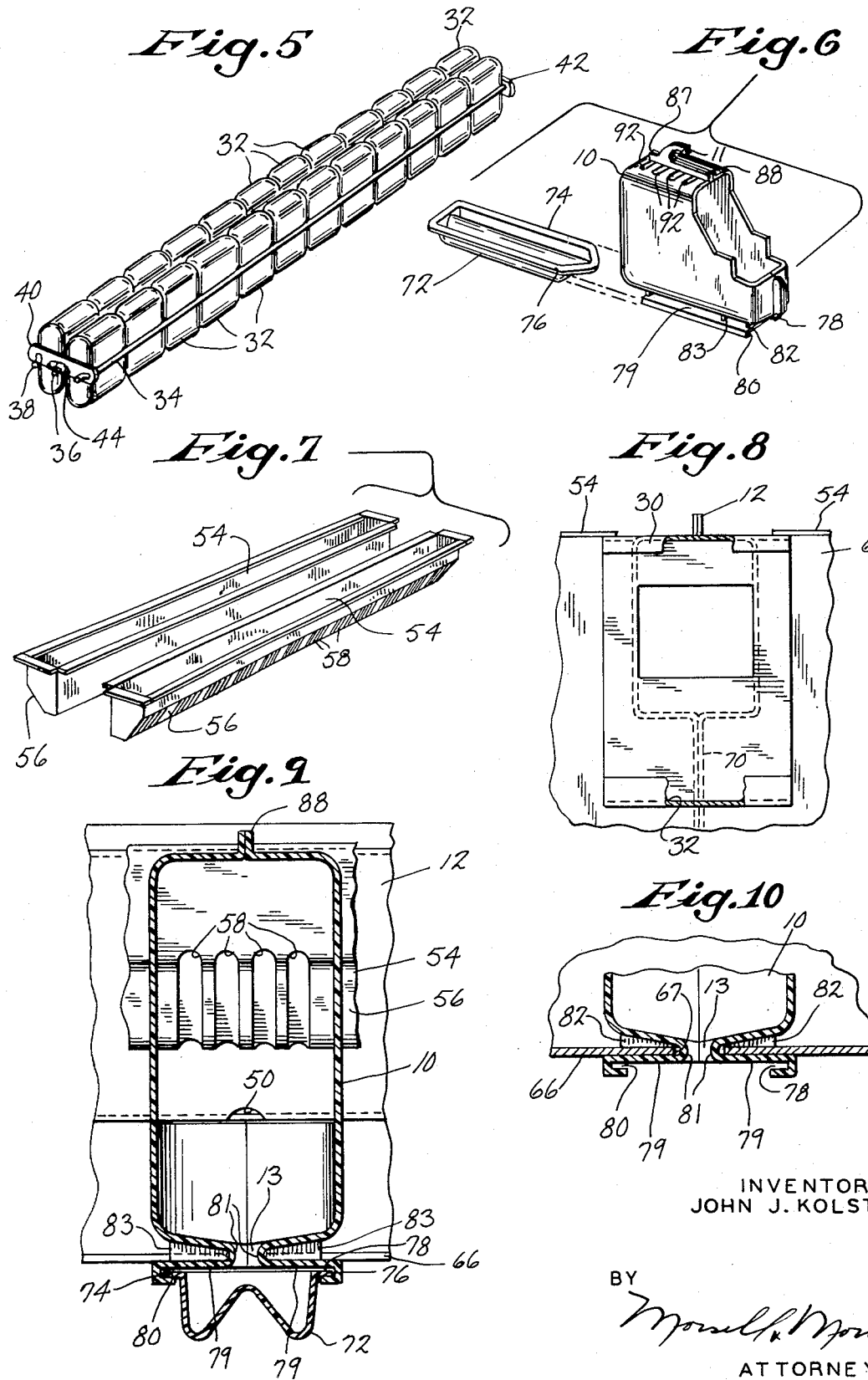

RODENT CAGE SYSTEM

BACKGROUND OF THE INVENTION

This invention relates to cages for housing laboratory rodents such as mice, rats, guinea pigs, or the like. A number of different cages and arrays of cages have been devised in the past for housing such rodents, but all of them have been found wanting in one particular or another in applications which require housing a large number of rodents in individual cages. One prior art array of cages is disclosed in U.S. Pat. No. 3,074,375, which was issued to M. P. Finkel on Jan. 22, 1963 for "Experimental Animal Maintenance." This prior art cage system provided a large array of independent cages which were all served by a common feed hopper, watering system, and waste removal system. Although the individual cages and feed hopper of this structure proved to be adequate in use, the watering system and waste removal system did not. In addition, the mechanical structure of the cage array lacked the requisite sturdiness to provide an adequate measure of mechanical stability for the system. A better water system was proposed in a later U.S. Pat., No. 3,127,872, which was issued to the same inventor on Apr. 7, 1964, for an "Experimental Animal Watering Device." This improvement in the watering system, however, had the drawback that the rodents were able to chew on the water container and enlarge the water openings therein. Moreover, this later patent did not deal with the defects in the prior art mechanical structure and waste removal system.

Accordingly, one object of this invention is to provide a rodent cage system which is sturdier in structure and easier to assemble and to service than those heretofore known in the art.

Another object of this invention is to provide a rodent cage system which is more reliable in operation than those heretofore known in the art and in which each cage is readily accessible for inspection or for removing or checking a rodent.

A further object of this invention is to provide a rodent cage system having an improved watering system in which the rodents are prevented from gnawing at the water containers.

An additional object of this invention is to provide a rodent cage system having an improved waste disposal system in which an individual waste collector is provided for each rodent.

Another object of this invention is to provide a rodent cage system which is more convenient in use than those heretofore known in the art.

A further object of this invention is to provide a rodent cage system which is more compact in structure than those heretofore known in the art.

SUMMARY OF THE INVENTION

In accordance with this invention, the above-noted objects are accomplished by providing a rodent cage system having a plurality of hollow cantilever beams journalled one above the other to a vertical supporting column. Each of the cantilever beams contains a plurality of water containers within the beam and a plurality of rodent cages disposed along the exterior of the beam and supported by cage-supporting means associated with the beam. Each of the water containers has a water outlet opening near its bottom. A row of water access openings is formed in the hollow beam to provide access from the cages to the water outlet openings. The water access openings are large enough to allow access to the water outlet openings but are too small to permit rodents within the cage to gnaw on the water containers. A feed hopper having a sloping side is attached along each of the cantilever beams between the beam and the adjacent rodent cages. The feed hoppers have slots formed therein which are small enough to prevent feed pellets from falling through the slots but are large enough to permit rodents to feed on the pellets through the slots. Each of the cages has individual means on the bottom of the cage for supporting a removable tray to dispose of the rodent's waste material.

DESCRIPTION OF THE DRAWINGS

FIG. 2 is a cross-sectional view taken on the line 2—2 of FIG. 1;

FIG. 3 is a plan view of the uppermost array of cages shown in FIG. 1;

FIG. 5 is a perspective view of a plurality of water containers of this invention;

FIG. 6 is a perspective view of one illustrative rodent cage and waste disposal tray of this invention;

FIG. 7 is a perspective view of the feed hoppers used in this embodiment of the invention;

FIG. 8 is an enlarged detail view taken on the line 8—8 of FIG. 4;

FIG. 9 is a cross-sectional view taken on the line 9—9 of FIG. 2; an

FIG. 10 is a fragmentary cross-sectional view taken on the line 10—10 of FIG. 2 with the dropping pan removed.

DETAILED DESCRIPTION OF THE INVENTION

This invention relates to means for housing a large number of mice, rats, guinea pigs, or other laboratory animals in a relatively small space.

Figure 1:
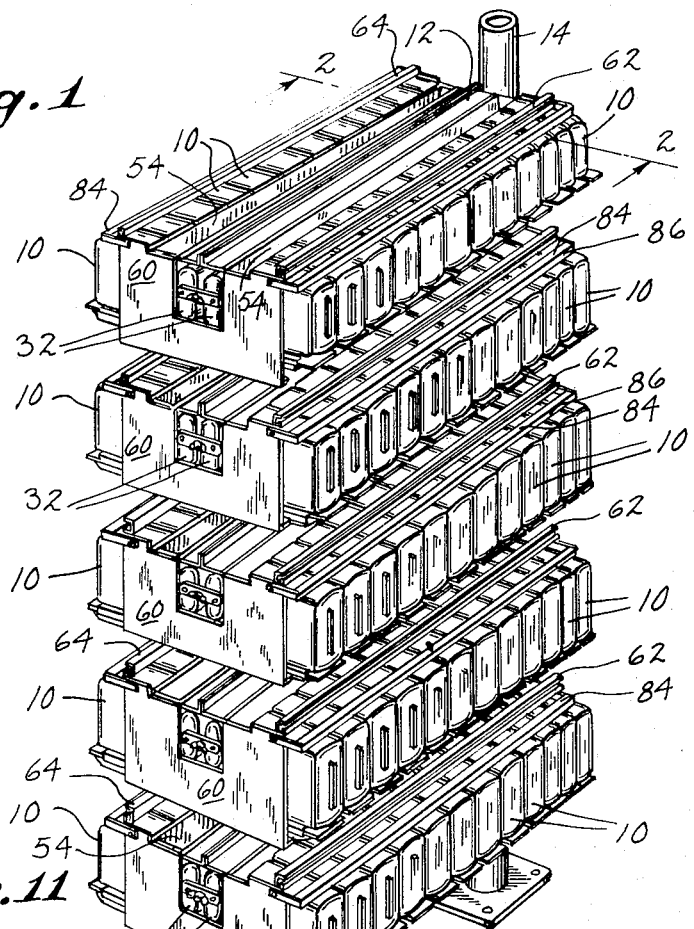
FIG. 1 is a perspective view of one illustrative embodiment of the invention.

Referring to FIG. 1, a relatively large number of individual rodent cages 10 are mounted in parallel rows in a vertical array containing, in the preferred embodiment, five different levels. Each of the different levels is identical to the others, and therefore the detailed description of the individual levels will be restricted to a description of the uppermost level in FIG. 1.

Figure 4:
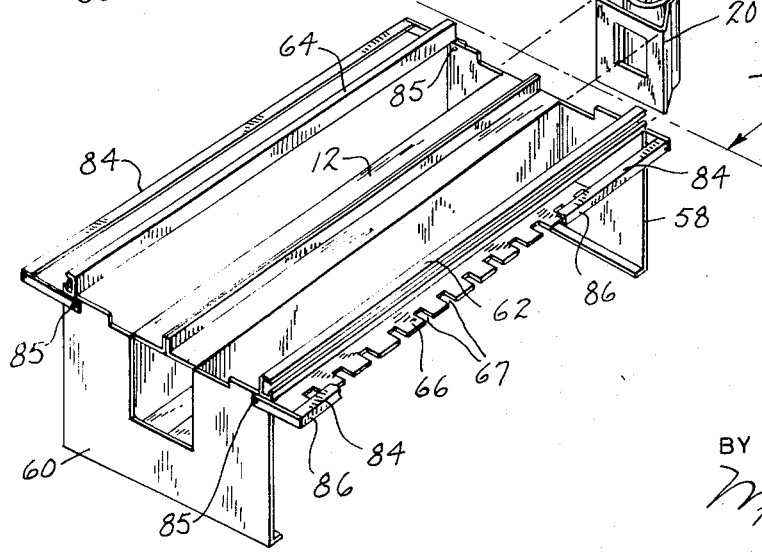
FIG. 4 is a perspective view of the hollow cantilever beam and cage-supporting structure of this invention.

The central structural unit for supporting the individual rodent cages 10 comprises a hollow cantilevered beam 12 which is journalled to a vertical pole 14 by means of a collar member 16 which is best illustrated in FIG. 4. Referring to FIGS. 1 through 4, the collar member 16 includes a hollow cylindrical collar 18 and a flat, outwardly extending support member 20 which is welded on two sides to the collar 18. The interior of the collar 18 has three nylon bearing members 22 which are secured to the interior of collar 18 by screws 24. The nylon bearing members 22 bear against the outer surface of the vertical pole 14 to aid lateral movement of the cantilever beam 12 about the post 14. The collar 18 is held in position vertically by means of a retaining ring 26 which is clamped onto the vertical pole 14 by means of a nut 28 and bolt 30.

The above-described collar assembly is removably secured to the hollow cantilever beam 12 by means of two hook-shaped protrusions 30 and 32 which are attached to the end of cantilever beam 12 and which engage the upper and lower surfaces of the member 20 to detachably secure the cantilever beam 12 to the collar assembly 16 which forms a journal bearing therefor.

The interior of the hollow cantilever beam 12 is adapted to receive a plurality of water containers which are illustrated independently in FIG. 5. The individual water containers 32 are held together by a frame comprising three rods 34, 36, and 38 which are joined together at their two ends by spacer plates 40 and 42 and wing nuts 44 and 46.

Figure 11:
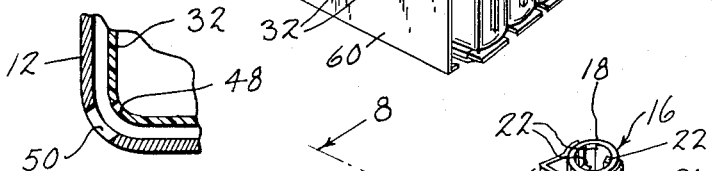
FIG. 11 is a fragmentary cross-sectional view of the water openings in the water containers and adjacent cantilever beam surface.

Referring to FIG. 2, each of the water containers 32 has a water outlet opening 48 formed in the bottom outer corner, and a matching water access opening 50 is formed in the hollow cantilever beam 12 opposite each of the water outlet openings. An enlarged view of the water outlet openings 48 and 50 is shown in FIG. 11. The water outlet openings 48 are small enough in their cross-sectional dimension so that the water will be held within the bottle by surface tension and will not spill unless the rodent disturbs the surface tension equilibrium condition by licking with his tongue on the water outlet opening. This concept is old in the art but, in the past, the surface tension watering systems had the drawback that the rodents would gnaw on the exposed end of the water containers and eventually enlarge the water openings to the point where the water would flow through instead of being held back by surface tension. In accordance with this invention, however, the water access openings 50 in the hollow cantilever beam 12 are large enough for the rodent to reach the water outlet openings 48 with his tongue but are too small to permit the rodent to chew or gnaw on the water containers. Each of the containers has a plug 52 on its lower surface for refilling the container. The water containers 32 are preferably made out of a plastic material such as polypropylene which is capable of being sterilized by steam in an autoclave or the like.

As best shown in FIG. 6, the individual cages 10 are open at part of one end and at an adjacent part of the top, and are each shaped to accommodate the above-described opening, and also to accommodate a feed hopper 54 which has a sloping side portion 56 in which are formed slots 58 (see FIG. 9). The slots 58 are close enough together to prevent feed pellets from falling through the slots into the rodent's cage, but far enough apart to allow the rodents to gnaw at the food pellets through the slots until they break into pieces which are small enough to fall through the slots into the cage.

The individual cages 10 are held in a spaced array along both sides of the cantilever beam 12 by means of a cage-supporting assembly comprising two end plates 58 and 60 (see FIG. 4) which are welded to the opposing ends of the cantilever beam 12, upper rack rails 62 and 64, which are welded between the end plates 58 and 60, and lower rack rails 66 and 68, which are attached to the bottom of the cantilever beam 12 by a central rib 70 (see FIG. 2). The individual cages 10 each contain a hook member 11 on the upper surface for engaging an upturned edge 63 of the lower flange of the rail 62 or 64. Each of the containers 10 is adapted to fit into the bottom rails 66 and 68, which are slotted as at 67 (see FIG. 4) so as to position each of the individual cages in its proper place in a longitudinal line along the cantilever beam 12.

The manner in which the individual ends of the cages are removably supported is best shown in FIGS. 2 and 10. Here it will be noted that the material of the cage at the margin of the bottom opening 13 is bent down as at 81 to join the flanges 79, and this material at 81 is received in the slots 67 of the bottom rail 66 (or 68). As the portions 81 slide into the slots 67, the material of the rail 66 (or 68) is received between the upper surfaces of the reverse flanges 79 and the lower edges of webs 82. Each cage is pushed into assembled position of FIG. 2 until the outer edge of the rail 66 (or 68) abuts a stop web 83 (see FIGS. 2 and 9). With this arrangement the inner portion of each cage is quickly located and removably supported. The upper portion of each cage is removably supported against downward movement by the engagement of its hook 11 with the upturned edge 63 of the rail 62 (or 64), as shown in FIG. 2. In order to prevent accidental disengagement of the hooks 11 from the rail 64 there are pivoted retainers 84, U-shaped in plan view, which are pivoted at each end as at 85 to the end plates 58 and 60 and which have elongated flanges 86 (see FIGS. 2 and 4) which extend the length of the beam. When the retainers 84 are swung down to the position of FIG. 2 the flanges 86 swing over the corners 87 of projectng ribs 88 at the tops of the containers. These swingable retainers effectively prevent the hooks from becoming disengaged from the rails 62 and 64.

The bottom of each of the individual cages 10 has an opening 13 formed therein (see FIG. 9), and the sides of the bottom of the cage are sloped so that the rodent's droppings will move under the influence of gravity through the opening 13. Below the opening 13 is a dropping pan 72 which is formed in the cross-sectional shape of the letter "W," and which has two outwardly-extending flanges 74 and 76 which are supported in inwardly directed groove members 78 and 80 which are on the underside of flanges 79 at the bottom of each of the individual cages 10. The flanges 79 are reversely bent portions from the margins of the slot 13. The individual cages are made out of a translucent plastic material and the dropping pans are made out of an opaque plastic material. It is essential that the cages be made out of a translucent material because the rodents tend to be stricken with claustrophobia if the cages are opaque. It is also preferable to provide slots 92 in the top and sides of the individual containers so as to admit more light and also to provide a means of circulation through the cage.

From the foregoing description it will be apparent that this invention provides a rodent cage system which is sturdier in structure and more reliable in operation than those heretofore known in the art and, although the invention has been described with reference to a specific embodiment thereof, it should be understood that the invention is not limited to the disclosed embodiment since many modifications can be made in the disclosed structure without altering its basic principles of operation. Accordingly, this invention includes all modifications falling within the scope of the following claims:

What we claim is:

1. A rodent cage system comprising an elongated beam having a bottom rail provided with longitudinally spaced slots and having tongue portions between slots, a row of cages, each cage having spaced lower end slots at the front thereof for receiving said tongues of the rail, and each cage having means cooperating with one of the slots in a rail for locating the cage, and cooperating means on said beam and on the upper portions of the cages for removably supporting the upper portions of the cages.

2. A rodent cage system as claimed in claim 1 in which the cooperating means at the upper portions of the cages comprises a hook on each cage and an elongated rail supported on the beam with which the hooks are removably engaged.

3. A rodent cage system as claimed in claim 2 in which there is cooperating means on the beam and on the cages including a swingable retainer bar for maintaining the hooks in engagement.

4. A rodent cage system as claimed in claim 1 in which there is an end plate connected with the beam and in which there is a cylindrical bearing sleeve for journalling the beam to an upright pole, there being means for removably connecting said bearing sleeve to said end plate.

5. A rodent cage system comprising a hollow elongated rigid beam open at one end, cage holding means associated externally with said beam and extending longitudinally therealong, a plurality of cages supported on said cage holding means, two rows of water holding containers positioned adjacent one another, a frame removably holding said two rows of containers in the form of an elongated assembly, said assembly being of a size and shape to be slidably received through the opening at the end of said beam, and there being cooperating openings in said water containers, beam and cages affording access to said water from the cages.

6. A rodent cage system comprising a hollow, elongated rigid beam; cage-holding means associated externally with said beam and extending longitudinally therealong; a plurality of cages supported on said cage-holding means; water-holding means mounted within said hollow beam, there being longitudinally spaced water outlet openings near the bottom of said water holding means, and there being a row of registering water access openings in said beam, each cage having an opening adjacent one of said water access openings, the water outlet openings of the water holding means being small enough in diameter that water within said water holding means is normally held by surface tension, and the water access openings in the beam being large enough to permit rodents to lick said water outlet openings but too small to permit the rodents to chew upon the water holding means.

7. A rodent cage system as defined in claim 6 wherein said water holding means comprises a plurality of individual water containers each having a water outlet opening near the bottom thereof.

8. A rodent cage system as defined in claim 7 and also comprising a continuous elongated feed hopper removably positioned along the side of said beam between said beam and said plurality of cages.

9. A rodent cage system as defined in claim 8 wherein said plurality of cages is positioned in two parallel lines on opposite sides of said beam, and further comprising a second continuous elongated feed hopper positioned along the opposite side of said beam from the first-mentioned feed hopper, said second feed hopper being positioned between a side of said beam and one of said lines of cages, and the first-mentioned feed hopper being positioned between the other side of the beam and the other of said lines of cages.

10. A rodent cage system as defined in claim 9 and further comprising a rodent dropping pan removably connected to the bottom of each cage.

11. A rodent cage system comprising a hollow elongated rigid beam, end plates attached to opposing ends of said beam and having portions projecting laterally therebeyond, a rail supported by said projecting portions of said end plates on each side of the beam, each rail having an upwardly projecting flange, a plurality of cages each having a hook on an upper portion thereof removably connected with one of said rail flanges, water holding means mounted within said hollow beam, said water holding means, beam and cages having registering openings affording access to water from the cages through said beam.

12. A rodent cage system comprising a housing having a bottom, a rodent cage, means supporting said cage adjacent to and externally of said housing, a water container removably mounted within said housing and having a water outlet opening near the bottom thereof, a water access opening in said housing below said water outlet opening, said cage having an opening adjacent said water access opening of said housing, said water outlet opening being small enough in diameter that water within the water container is normally held by surface tension, and said water access opening in the housing being large enough to permit rodents to lick the water outlet opening of the water container but too small to permit the rodents to chew upon the water container.

13. A rodent cage system comprising an elongated rigid beam, a row of cages, cooperating means on said beam and cages for removably supporting the cages along said beam, said cooperating means including a hook on each cage, and an elongated rail supported on the beam with which the hooks are removably engaged, and also including a swingable retainer bar for releasably maintaining the hooks in engagement.

* * * * *